United States Patent [19]
Wagner et al.

[11] Patent Number: 5,133,592
[45] Date of Patent: Jul. 28, 1992

[54] ACTUATING UNIT FOR AN ANTI-LOCK BRAKE SYSTEM FOR AUTOMOTIVE VEHICLES

[75] Inventors: Wilfried Wagner, Huettenberg-Weidenhausen; Lothar Schiel, Hofheim; Chistoph Jung, Eppstein/Ts, all of Fed. Rep. of Germany

[73] Assignee: Alfred Teves GmbH, Frankfurt am Main, Fed. Rep. of Germany

[21] Appl. No.: 593,709

[22] Filed: Oct. 5, 1990

[30] Foreign Application Priority Data

Oct. 7, 1989 [DE] Fed. Rep. of Germany ....... 3933636

[51] Int. Cl.$^5$ ............................ B60T 8/32; B60T 13/52
[52] U.S. Cl. ................................. 303/114 R; 188/357; 303/114 PN
[58] Field of Search ............................. 60/547.1, 558; 303/114 PN, 114 R; 188/356, 357

[56] References Cited

U.S. PATENT DOCUMENTS

| | | | |
|---|---|---|---|
| 2,820,344 | 1/1958 | Stelzer | 188/357 |
| 4,512,615 | 4/1985 | Kita et al. | 303/114 PN |
| 5,031,971 | 7/1991 | Boehm et al. | 188/356 X |

FOREIGN PATENT DOCUMENTS 3843159  6/1990  Fed. Rep. of Germany ...... 303/114 PN

*Primary Examiner*—Matthew C. Graham
*Attorney, Agent, or Firm*—Robert P. Seitter; J. Gordon Lewis

[57] ABSTRACT

An actuating unit for anti-lock brake systems for automotive vehicles comprised of a vacuum brake power booster and a tandem master brake cylinder, wherein on failure of the primary pressure chamber a force is simulated which is opposed to the actuating force. For this purpose, a compression spring (28) is arranged in the booster housing (10) which is brought into force-transmitting engagement with the input member only after a predetermined distance of travel of the input member has occurred (3, 23).

7 Claims, 2 Drawing Sheets

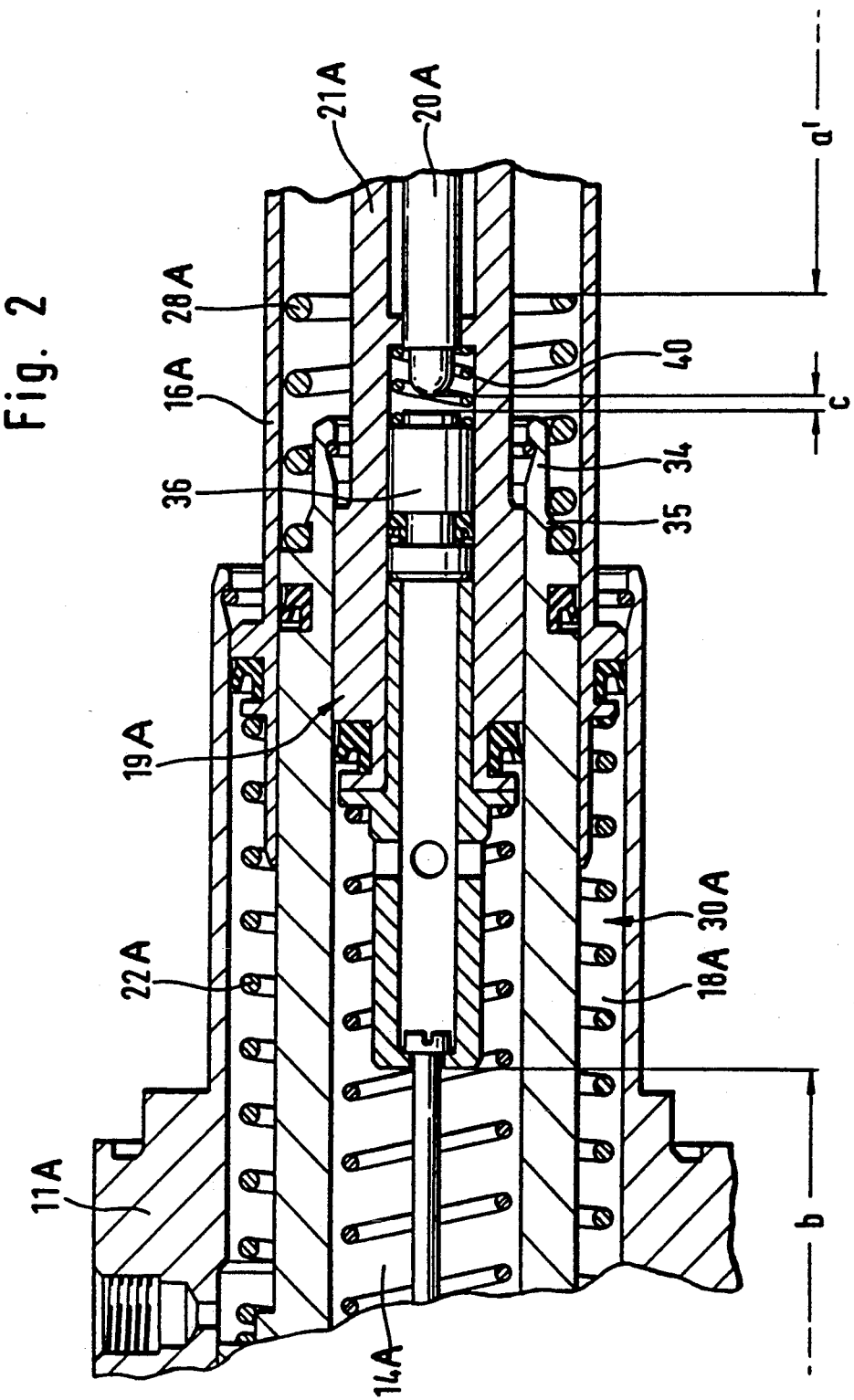

ACTUATING UNIT FOR AN ANTI-LOCK BRAKE SYSTEM FOR AUTOMOTIVE VEHICLES

BACKGROUND OF THE INVENTION

The present invention relates to an anti-lock brake system for automotive vehicles including a master brake cylinder, such as a tandem master cylinder, and a vacuum brake power booster which is inserted ahead of the master cylinder and is operable by means of an input member. The primary piston of the tandem master cylinder is of two part construction and includes an external piston and an internal piston guided within the external piston. A movable wall separating a vacuum chamber and a working chamber in the vacuum brake power booster is adapted to move independently of the input member and is in driving engagement with the external piston. Means are provided which, on failure of the primary pressure chamber of the tandem master cylinder, provide a force effective at the input member which is dependent on the inlet force and is opposed to the inlet force.

A similar actuating unit is described in German patent application P 39 19 216.4. In order that the pressure proportional to the inlet force can be developed in the secondary pressure chamber in the event of failure of the primary pressure chamber, a reaction device is arranged in the primary pressure chamber so that a boosting force proportional to the inlet force is transmitted onto the secondary piston. The reaction device is formed by an elastic reaction plate which is arranged in the force-transmitting sleeve. The plate is in operative engagement with the external piston by way of the force-transmitting sleeve and directly with the internal piston. An opening mechanism of a first central valve is supported on the plate. The central valve is allocated to the primary pressure chamber. Particularly disadvantageous characteristics of these devices are the additional axial overall length that is required for the installation of the reaction device and the complicated length dimensions for mounting purposes. The manufacturing expenses are accordingly excessive.

Therefore, it is an object of the present invention to substantially eliminate the above-mentioned disadvantages and to improve upon an actuating unit of the type described to accomplish shortening of the overall axial length of the actuating unit, while reducing the manufacturing costs.

SUMMARY OF THE INVENTION

This object is achieved by the present invention in that the means which, on failure of the primary pressure circuit, generate at the input member a force opposed to the inlet force are arranged outside the mater cylinder but inside the booster housing. A compression spring is located to be engaged by the input member after a predetermined travel distance according to a feature of the present invention.

In one embodiment of the present invention, the internal piston is of integral design with a valve piston that is in force-transmitting engagement with the input member. The valve piston is provided with a transverse pin for transmitting the inlet force onto an intermediate piston that is interposed between the input member and the internal piston. The compression spring is stationarily supported and is arranged at a predetermined distance from the transverse pin which corresponds to the actuating travel of the primary piston into engagement with the secondary piston on failure of the primary pressure chamber. Accordingly, after the primary piston has performed the actuating stroke, a counterforce (reaction force) corresponding to the pressure build-up in the secondary pressure chamber is simulated, and hence controls the brake force resulting from the pressure prevailing in the secondary pressure chamber proportional to the inlet force.

In another embodiment, a force-transmitting element is sealedly guided in the external piston and is spaced axially from the internal piston in the actuating direction, the predetermined distance referred to above corresponds to the sum of the actuating travel of the primary piston and the axial distance between the force-transmitting element and the internal piston.

Another feature of the present invention is that the tandem master cylinder is attached on the booster housing by means of an intermediate member projecting into the booster housing and the intermediate piston is an annular piston and is arranged coaxially relative to the primary piston, and wherein an advantageous guidance of the compression spring is accomplished in that the compression spring is arranged coaxially to the annular piston. This coaxial arrangement preferably is radially within the annular piston. The compression spring is mounted on a cylindrical projection of the intermediate member, or is arranged radially inside the annular piston and is mounted on a cylindrical extension of the master cylinder housing.

BRIEF DESCRIPTION OF THE DRAWING

Further features of the present invention will be described in greater detail in the following detailed description of two embodiments with reference to the accompanying drawing, wherein.

DETAILED DESCRIPTION

Figure 1:
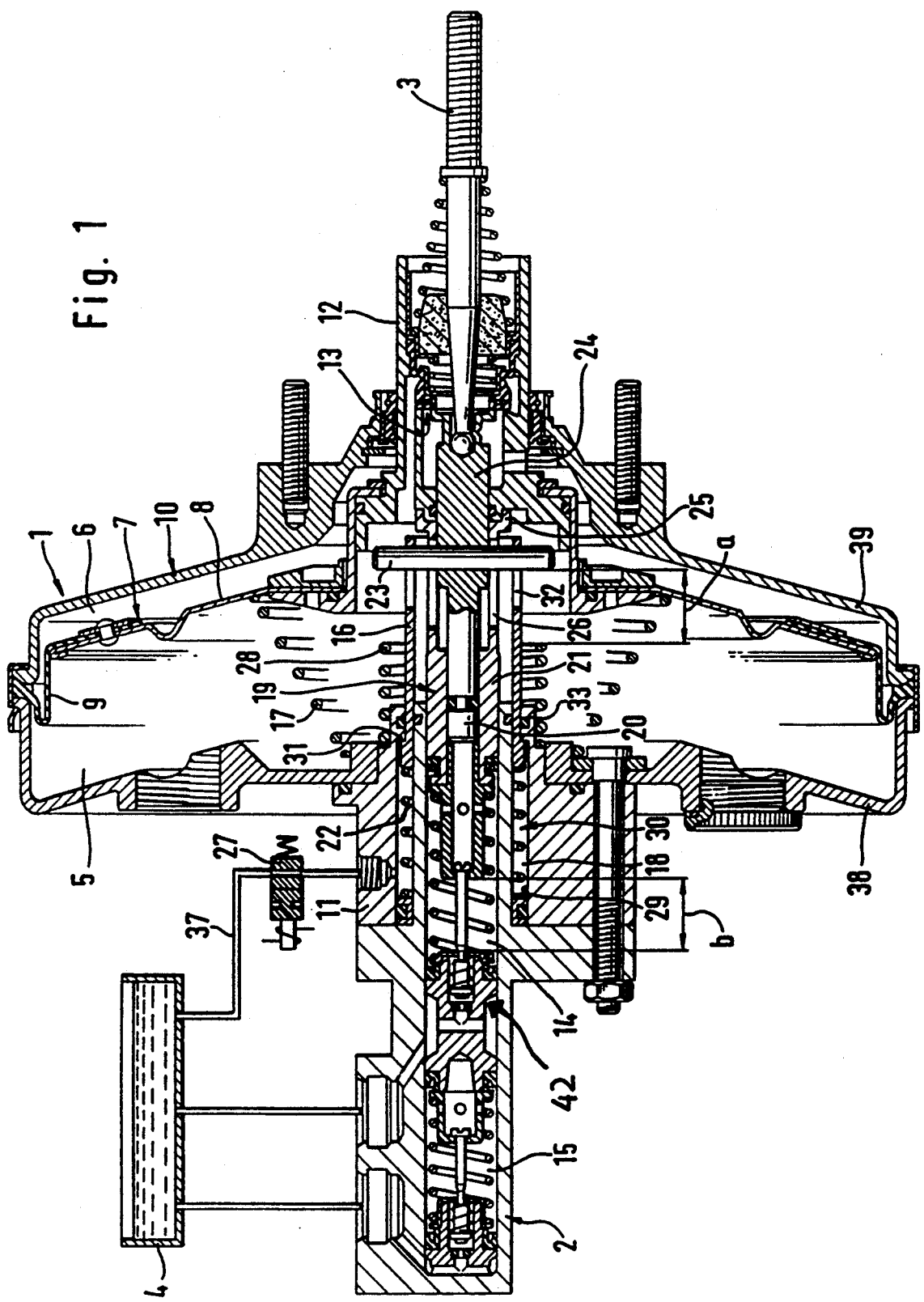
FIG. 1 is an axial cross-sectional view of a first embodiment of the present invention; and, FIG. 2 is a partial sectional view of a second embodiment of the present invention.

The actuating unit shown in FIG. 1 includes a vacuum brake power booster 1 which is operable by way of an input member 3 by a brake pedal (not shown), and of a master brake cylinder, preferably a tandem master cylinder 2, which is inserted after the vacuum brake power booster 1 and is in communication with a pressure-fluid supply reservoir 4. The vacuum brake power booster 1 comprises two disk-shaped housing parts 38, 39 which are assembled with their open sides face to face to form a booster housing 10. The housing part 38 shown on the left side in FIG. 1 is provided with pneumatic ports and is rigidly coupled to the tandem master brake cylinder 2 by way of an intermediate member 11. In the right-hand housing part 39, a control valve housing 12 accommodating a control valve 13 is slidingly and sealedly guided.

The interior of the booster housing 10 is subdivided by a movable wall 7 arranged therein into a first working chamber 5 as well as a second working chamber 6 which latter is vented by means of the control valve 13 during a normal braking operation. The movable wall 7 comprises a diaphragm plate 8 and a rolling diaphragm 9 abutting thereon. The control valve 13 is actuated by a valve piston 24 linked to the input member 3. Input member is drivingly connected to an annular piston 16, which in turn is slidably guided to move in a hydraulic chamber 30. To reset the movable wall 7, a resetting spring 17 is provided which is clamped between the front housing part 38 and the diaphragm plate 8. The hydraulic chamber 30, whose connection 37 to the pressure-fluid supply reservoir 4 is closable, for example, by an electromagnetically actuatable retention valve 27, is formed by an annular chamber 18 which is confined by the wall of a bore 29 provided in the intermediate member 11 and by the tandem master brake cylinder 2 slid into bore 29.

The annular piston 16 is biassed in the direction of the movable wall 7 by a compression spring 22 arranged in the hydraulic chamber 30. Piston 16 abuts on an annular surface 31 provided on the intermediate member 11 when it is in its inactive position, and also is provided with axially extending radially opposite the slots 32 on the end thereof adjacent to the movable wall 7. The slots 32 receive and guide a transverse pin 23 projecting through the valve piston 24. The length of the slots 32 preferably is sized such that the input member 3 and/or the valve piston 24 can cover a defined limited travel in the actuating direction from the retracted position of the input member before the transverse pin 23 comes to abut on the annular piston 16. The end of the valve piston 24 adjacent the master brake cylinder is integral with an internal piston 20, forming one part of a primary piston 19 which confines the primary pressure chamber 14 of the tandem master brake cylinder 2. The second part of the primary piston 19 is comprised by an external piston 21 supported on the control valve housing 12 through a cylindrical boss portion 25. The boss portion 25 axially abuts on the control valve housing 12. The external piston 21 is provided with a recess 26 which permits relative movement of the two parts 20, 21 with respect to each other.

In order to impart to the driver a proper brake feeling in the event of failure of the primary pressure chamber 14 of the tandem master cylinder 2, when the input member 3 moves through its full travel and the primary piston 19 moves into abutment on the secondary piston 42 (referred to), a compression spring 28 is provided in the inside of the booster housing 10 which is brought into force-transmitting engagement with the input member 3 after a predetermined travel a of the input member 3 from its retracted position. This compression spring 28 preferably is arranged coaxially to the annular piston 16 and/or primary piston 19 and is so fastened to an axial cylindrical projection 33 provided on the intermediate member 11 that its free end is at the distance a from the transverse pin 23 which distance 3 equals the actuating travel distance b of the primary piston 19 on failure of the primary pressure circuit 14. By this arrangement, the effect of a counterforce is imparted to the driver which simulates the reaction force that results from the hydraulic pressure prevailing in the secondary pressure chamber 15. The magnitude of the reaction force is dependent on the extent of travel of the brake pedal. Simultaneously, the spring rate of the compression spring 28 dictates the simulated transmission ratio of the brake device, a low spring rate (N/mm) being indicative of a large transmission ratio, while a high spring rate corresponds to a small transmission ratio.

In the embodiment shown in FIG. 2, the compression spring 28 is located radially inside the annular piston 16, its external diameter approximately corresponding to the internal diameter of the annular piston 16. In this arrangement, the compression spring 28 is located on a cylindrical extension 34 of the master cylinder housing which is provided with form-locking means, for example retaining noses 35, which axially retain the compression spring 28.

In the actuating unit partially illustrated in FIG. 2, to achieve a response characteristic with an abrupt rise in the outlet force (so-called two-stage reaction effect), a force-transmitting element 36 is inserted after the internal piston 20A in the actuating direction which is sealedly guided in the external piston 21A at an axial distance c from the internal piston 20A. The force-transmitting element 36 bears against the external piston 21A by way of a spring 40 which is in its stretched length, that is unbiassed, in its mounted state.

The spring force of spring 40 counteracts the reaction force resulting from the hydraulic pressure in the primary pressure chamber 14A and defines the magnitude of the abrupt rise of the response characteristic. The distance a' between the transverse pin 23 (FIG. 1) which is not shown in FIG. 2 and the free end of the compression spring 28A corresponds in this arrangement to the sum of the actuating travel b of the primary piston 19A and the axial distance c between the end of the internal piston 20A and its associated end surface of the force-transmitting element 36.

What is claimed is:

1. An actuating unit for an anti-lock brake system for automotive vehicles comprised of a tandem master cylinder having a housing, a primary and secondary piston normally spaced apart and each movable in said master cylinder housing respective primary and secondary pressure chambers defined in said master cylinder housing by said primary and secondary pistons respectively an input member movable from a retracted position and means causing advance of said tandem master cylinders primary and secondary piston upon advance of said input member from said retracted position; a vacuum brake power booster operable by means of said input member, with said primary piston of the tandem master cylinder being composed of an external piston and an internal piston guided therein, said vacuum brake power booster having a housing with a movable wall separating said housing into a vacuum chamber and a working chamber, said movable wall adapted to move independently of said input member and being in driving engagement with said external piston, and means effective on failure of said primary pressure chamber of said tandem master cylinder to generate a reaction force resisting advance of said input member only after a predetermined distance of travel from said retracted position, said means including a compression spring element mounted within said booster housing external of said tandem master cylinder, said compression spring element having one end anchored to be fixed relative said input member and a free end located towards said input member, a spring engagement feature carried with said advance of said input member and located with said input member in said retracted position said predetermined distance from said free end of said spring element.

2. An actuating unit as claimed in claim 1, further including a valve piston drivingly engaged by said input member, and wherein said primary piston includes said internal piston being integral with said valve piston said valve piston being provided with a transverse pin comprising said engagement feature and wherein said free end of said compression spring element is at a distance from said transverse pin which corresponds to the distance said primary and secondary pistons are spaced apart, whereby on failure of said primary pressure chamber said primary piston engages said secondary piston and said compression spring element is engaged by said pin at the same point.

3. An actuating unit as claimed in claim 2, further including a force-transmitting element spaced axially from said internal piston in the actuating direction, and wherein said predetermined distance equals the sum of the distance between said primary piston and said secondary piston and the axial distance between said force-transmitting element and said internal piston.

4. An actuating unit as claimed in claim 3, wherein the tandem master cylinder is attached on the booster housing by means of an intermediate member projecting into the booster housing and an annular piston is arranged coaxially relative to said primary piston, and wherein said compression spring element comprises a coil spring arranged coaxially relative to said annular piston.

5. An actuating unit as claimed in claim 4, wherein said compression coil spring is arranged radially outside said annular piston and is mounted on a cylindrical extension provided on said intermediate member.

6. An actuating unit as claimed in claim 4, wherein said compression spring is arranged radially inside said annular piston and is mounted on a cylindrical extension provided on said master cylinder housing.

7. An actuating unit as claimed in claim 6, wherein said projection and said extension are provided with form-locking retaining means including retaining noses which prevent axial movement of the compression spring.

* * * * *